Patented Oct. 19, 1948

UNITED STATES PATENT OFFICE 2,451,659

RECOVERY OF PROTEINS FROM SOYBEANS IN PRESENCE OF BLANKETING AGENTS AND ENZYME INHIBITORS

Francis E. Calvert, Cincinnati, Ohio, assignor to The Drackett Company, Cincinnati, Ohio, a corporation of Ohio No Drawing. Application November 5, 1946, Serial No. 707,973

4 Claims. (Cl. 260—112)

This invention relates to an improved process for the treatment of proteinaceous materials of vegetable origin, and has for its principal object the preparation of a white or substantially white vegetable protein and of products and compositions containing such protein.

Protein substances have valuable and extensive application in many industrial processes. They are used in the paper industry as the basis of a coating or size for paper, in the plastics industry generally, and in the fabrics field in the form of synthetic fibers. In many of these fields, it is essential that the protein employed be substantially free from color, and the difficulty of producing a light colored or white protein from vegetable sources has proved a serious limitation on the extent of use of such protein.

Thus the final color of dry proteins prepared from vegetable sources may vary from black to light yellow, the more common intermediate shades being dark brown, red, red-brown, and light brown. It can be shown that in protein obtained by existing methods, the color depends primarily upon the particular seeds from which the protein is isolated, and upon the method of isolation. As heretofore produced, most of the vegetable protein is unsatisfactory in the preparation of paper coating, sizings for light colored wall papers, button stock, and for use in other fields in which the final product must be light in color, unless heavily pigmented with white pigments. Pigmentation, however, results in reduction in strength and transparency of the product, and is therefore undesirable.

I have discovered that the coloration observed in such proteins is largely the result of oxidation which occurs in the normal processing of the vegetable material to obtain the protein substance therefrom, the native protein in the bean or seed being usually nearly white or colorless. The oxidation of the protein is a biological phenomenon, catalyzed by oxidative enzymes which are present in the plants or seeds. Apparently this biological oxidation is a protective mechanism developed by the plant to protect it against mechanical injury, the several phases of the process being essentially as follows:

1. Mechanical injury liberates oxidizing enzymes and a chromogenic substance.
2. The oxidizing enzymes, utilizing oxygen from the air or water contained in the vegetable substance, oxidize the chromogenic substance (probably a phenol) to produce a quinone.
3. The quinone (probably an ortho-quinone) acts as an antiseptic to kill bacteria at the point of injury, thus preventing decay.
4. The quinone simultaneously tans the protein at the point of exposure to produce a mechanical barrier in the nature of scar tissue, preventing further entrance of bacteria.
5. The quinone polymerizes to an insoluble brown pigment.

It should be noted that in the normal processing of protein-yielding vegetable raw materials for the production of protein, the raw materials are subjected to mechanical injury and the formation of a darkly colored product is thus immediately initiated.

It thus appears that three factors contribute to the formation of color in vegetable proteins during processing of the source material, namely oxidizing enzymes, oxygen, and chromogenic or aromatic substances, and that if one of these factors is absent, or chemically or physically inhibited or repressed, the protein should be substantially white. From a practical standpoint, however, I have found that it is impossible to remove completely any one of these factors without destroying or harming the proteins. On the other hand, I have found that if two of these factors are isolated as completely as is practicable, the resulting protein is substantially without color.

The invention therefore contemplates the removal or inhibition of two or of all three of these factors, preferably the oxidizing enzymes and oxygen, either during the entire period of processing the raw material or during the more critical period in which the major discoloration is found to occur.

More specifically, it is an object of the invention to produce a white or nearly colorless protein by processing proteinaceous material derived from vegetable sources, such as the soybean, peanut, cottonseed, and the like, in the presence of an enzyme inhibiting agent and an oxygen excluding or blanketing agent, whereby enzyme activity is minimized and oxygen is removed from contact with the protein molecule. As an adjunct to this treatment, the invention contemplates the removal of chromogenic substances from the vegetable source, for instance by extraction from the raw material with lower primary alcohols, such as methanol or ethanol.

Example I is a typical standard process for isolating soybean protein. Typical methods of practicing this invention in conjunction with standard isolation procedures are set forth in specific Examples II to IX inclusive, it being understood that these examples are illustrative only and are not to be construed as limiting the scope of the invention as elsewhere defined.

EXAMPLE I [1]

To 3,000 grams of water containing 3 grams of sodium hydroxide are added 200 grams of substantially oil-free soybean flakes. The extraction temperature may be varied over a wide range, but the preferable temperature is 45° C.

---
[1] Typical standard isolation process for soybean protein.

The extraction time may also be varied but the preferred time is usually 30 minutes. During this extraction period the alkaline slurry is slowly but continuously stirred. The pH range may also be varied by adjustment of the amount of alkali from pH 7.5 to 11.5 although the preferred pH range is from 9 to 10. The spent meal is separated from the yellow protein liquor by straining through cheesecloth. The spent meal is discarded and the yellow protein liquor is clarified usually by centrifuging. The clarified liquor is then acidified to precipitate the protein. Sulfuric acid (dilute) is usually used but other acids may be substituted. In order to recover the maximum amount of protein the pH is usually held between 4.2 and 4.8 although other pH ranges may be used. To improve handling properties the clarified liquor is often heated up to 75° C. before acidification.

The protein curd resulting from the acidification is filtered off from the spent liquor, and the curd is dried in an air oven at 45° C.

The resulting dried protein is a flinty, glassy, brownish-yellow product. Examination under the microscope with bottom illumination discloses a clear amber transparent glassy protein substance and is typical of the usual commercial soybean proteins.

EXAMPLE II

Into an extraction bath containing a mineral oil, which does not contain extractable coloring materials, are introduced 200 grams of substantially oil-free soybean flakes by means of a funnel so that the flakes do not contact the layer of oil on the surface of the extracting liquor. The stirrer is rotated slowly to minimize the amount of oil that is mixed into the solution. The extration bath comprises 3,000 grams water at 45° C., 3 grams sodium hydroxide, 1.3 grams $NH_4SCN$ and 1.3 grams of $Na_2S_2O_5$. The sodium metabisulfite and ammonium thiocyanate are used to inhibit the oxidizing enzymes and the oil layer prevents the air from contacting the flakes during the extraction. At the end of the extraction period, the excess mineral oil is removed. The entire process of isolation, including the steps of extraction, clarification, precipitation, filtering and drying, may be carried out as described in the typical standard procedure of Example I. The dried protein which contains some mineral oil is extracted with a solvent. The solvent is evaporated off and the resulting protein is a pale yellowish-white product which to the naked eye appears to be opaque and dull (not at all glassy).

Examination under the microscope with bottom illumination shows a colorless product containing many minute bubbles dispersed throughout, creating the impression that the product is opaque to the naked eye. Thus by excluding air from the protein molecule during extraction, and inhibiting the oxidizing enzymes, a colorless protein is obtained, differing from ordinary soy protein as water white glass differs from amber glass.

EXAMPLE III

The oil is extracted from 250 grams of flaked soybeans, using hexane as a solvent. While the flakes are still wet with the solvent, the excess of hexane is pressed out and the flakes still damp with hexane are immersed in the following bath with stirring:

| | Grams |
|---|---|
| Water | 3,000.0 |
| $NH_4SCN$ (ammonium thiocyanate) | 1.3 |
| $Na_2S_2O_5$ (sodium metabisulfite) | 1.3 |

After stirring for 10 minutes at a temperature of 45° C., 3 grams of sodium hydroxide are added. The typical standard procedure of extraction, straining, clarification, precipitation, filtering, and drying is then followed. The resulting dried protein is a pale ivory colored opaque product to the naked eye. Examination under a microscope reveals the product as colorless and resembling the product produced in Example II, differing markedly from the amber horny protein produced by the standard method. In this process hexane is the blanketing agent and the $NH_4SCN$ and $Na_2S_2O_5$ are the enzyme inhibitors.

EXAMPLE IV

Two hundred (200) grams of substantially oil-free soybean flakes are submerged in octyl alcohol (ethyl hexyl) until the entrained air is displaced. The flakes are pressed to remove the excess octyl alcohol and while still damp with the octyl alcohol are immersed in an extraction bath containing 3,000 grams water, 1.3 grams $NH_4SCN$ and 1.3 grams $Na_2S_2O_5$. The bath is stirred for 10 minutes and 3.0 grams of alkali added. Extraction, straining, clarification, precipitating, filtering, and drying are conducted according to the typical isolation procedure. The resulting protein is a brilliant white opaque product to the naked eye. Under the microscope with bottom illumination the protein appears colorless like ground water white glass. Octyl alcohol appears to be unusually well suited for removing and then blanketing air from the extraction bath. The $NH_4SCN$ and $Na_2S_2O_5$ are the enzyme inhibitors.

EXAMPLE V

Five hundred (500) grams whole raw peanuts with red skins are finely ground in a food chopper. The oil is extracted with hexane. The substantially oil-free peanut meal is freed of hexane by air drying.

The dry peanut meal is then wet thoroughly with actyl alcohol (ethyl hexyl) by immersion. The excess octyl alcohol is pressed out mechanically and the peanut meal still wet with the octyl alcohol is immersed in 3,000 cc. water at 25° C., containing 1.3 grams $NH_4SCN$ and 1.3 grams $Na_2S_2O_5$, mixed 10 minutes, then 3.1 grams of NaOH dissolved in 15 cc. water are added. The temperature is maintained at 25° C. throughout, including during precipitation. The isolation procedure followed is the same as described in the typical standard procedure for soybeans as set forth in Example I. The resulting protein is white and far superior in color to the control run without the blanketing and inhibiting agents. The control is a red brown protein isolated as described in the literature at 25° C. throughout. Thus by application of the present process a white peanut protein may be isolated from red skinned peanuts where heretofore only red or brown proteins resulted.

EXAMPLE VI

Two hundred (200) grams of substantially oil-free soybean flakes are submerged in pine oil until the entrained air is displaced. The flakes are pressed mechanically to remove the excess pine oil. The flakes still damp with pine oil are immersed in an extraction bath containing 3,000 grams of water and 2 grams of sodium azide. The pH of this bath was 6.35. Extraction, straining, clarification, precipitating, filtering, and drying are conducted according to the typical procedure as given in Example I. The excess pine oil is removed from the resulting protein by extraction with hexane. The protein obtained is a dull opaque white product with a scarcely perceptible yellow tinge to the naked eye. Microscopic examination reveals the protein to be transparent and colorless, differing markedly from the brownish product produced by conventional methods. In this process, water is the protein solvent, pine oil is the blanketing agent, and sodium azide is the enzyme inhibitor.

EXAMPLE VII

Two hundred (200) grams of substantially oil-free soybean flakes are submerged in lauryl alcohol until the entrained air is displaced. The flakes are pressed mechanically to remove excess lauryl alcohol. The pressed flakes still damp with lauryl alcohol, are immersed in an extraction bath containing 3,000 grams of water, 30 grams of urea, and 2 grams of thiourea. Extraction, straining, clarification, precipitating, filtering, and drying are conducted according to the typical procedure. The resulting protein contains excess lauryl alcohol and this is removed by solvent extraction. The extracted protein is a dull opaque white product with a faint yellowish tinge to the naked eye. Examination with a microscope reveals a colorless transparent product which resembles water white ground glass. In this process the aqueous urea solution is the protein solvent, the lauryl alcohol is the blanketing agent, and the thiourea is the enzyme inhibitor.

EXAMPLE VIII

Two hundred (200) grams of substantially oil-free soybean flakes are immersed in tri-octyl phosphite until the entrapped air is displaced. The flakes are pressed to remove excess tri-octyl phosphite. The pressed flakes still damp with the tri-octyl phosphite are immersed in an extraction bath containing 3,000 grams of water, 2 grams of sodium chloride, and 1 gram of sodium thiosulfate. Extraction, straining, clarification, filtering, and drying are conducted according to the typical procedure. The resulting protein contains excess tri-octyl phosphite and this is removed by hexane extraction. The isolated protein is a dull, flat, opaque white product with a scarcely perceptible yellow tinge to the naked eye. Microscopic examination discloses that the product is colorless and transparent and resembles water white ground glass. In this process the aqueous sodium chloride is the protein solvent, tri-octyl phosphite is the blanketing agent and sodium thiosulfate is the enzyme inhibitor.

EXAMPLE IX

One hundred and fifty (150) grams of green soybeans (pod free) are immersed in octyl alcohol. The octyl alcohol-green bean mixture is ground together into a paste in order to insure thorough mixing. The mixture is allowed to stand 10 minutes and any octyl alcohol that separates is poured off. The green colored paste is then immersed in an extraction bath containing 2,000 grams of water, 1 gram of sodium metabisulfite and 2 grams of sodium hydroxide. Extraction, straining, clarification, precipitating, filtering, and drying are conducted according to the typical procedure. The dried protein is yellow-green in color and contains excess octyl alcohol and this excess is removed by extraction with 90% hexane and 10% methanol. A surprising thing is the complete removal of the yellow-green color from the protein during removal of the excess octyl alcohol. The resulting protein is a dull, opaque white product with only a barely perceptible yellow cast to the naked eye. Examination under a microscope reveals a colorless transparent protein resembling proteins produced from commercial soybean flakes by my process. The solvent in this process is aqueous sodium hydroxide; the blanketing agent is octyl alcohol; and the enzyme inhibitor is sodium metabisulfite.

Thus by the application of my invention, green protein-yielding vegetable materials may now be used as a source of white or substantially white industrial proteins. Heretofore proteins from green protein-yielding vegetable materials could not be used industrially or otherwise because of their poor color ranging from deep green to black. It is apparent that the blanketing agent insulates that portion of the protein molecule which combines with color bodies like chlorophyll in addition to isolating the system from oxygen. The enzyme inhibitor, by minimizing the activity of the enzyme, effectively reduces the amount of actual color formed.

While the lightest colored proteins are obtained when the blanketing agent is present during the entire period of the isolation procedure, material improvement may be effected by introducing the agent at any time during the process or even immediately prior to the drying of the protein curd, presence of the agent during the drying period being essential. For this reason it is believed that the blanketing agents perform a function in addition to the exclusion of air or oxygen which may be briefly described as an anti-aggregation effect, the formation of giant molecules by the joining of molecules during the drying period being retarded or prevented by the agent. A possible explanation of this function is as follows:

The wet proteins are highly swollen by water and have water between their molecules. As this water is removed the protein molecules attract each other through secondary forces and thus aggregate to large molecules. However, when a blanketing agent is present, this agent gradually enters the area occupied by the water as the water is removed, thus physically preventing the protein molecules from aggregating or packing together. The protein is then freed of practically all water by, for example, drying and thus becomes rigid. Removal of the blanketing agent by an organic solvent that is unable to swell the protein then leaves the protein in a distended low molecular weight condition containing many voids of molecular size like a sponge. This would be one way of explaining another effect observed, namely, that proteins prepared by my invention dissolve much more rapidly in protein solvents than proteins prepared by ordinary procedures.

In this connection it may be pointed out that by the practice of my invention, improved results other than in the whiteness of the protein are achieved. For instance, when protein prepared as in Example I is soaked in water for 30 minutes and then dissolved by the addition of caustic soda, a tremendous swelling occurs, finally resulting in a gel. In order to break down this gel, and obtain a thin solution, the protein must be heated and mechanically stirred. In contrast, protein prepared in accordance with the present invention, when similarly soaked in water and dissolved with caustic soda, swells momentarily and then almost immediately breaks down into a thin solution, without the aid of heat or mechanical agitation. It is believed that by the present process, the protein is brought to such physical condition that the alkali immediately dissolves the same without a prolonged swelling and gelation period, and that pound and the degree of protection afforded thereby being indicated.

*Blanketing agents tested with soy protein*

|  | Effective protection | B. P., °C. | Solubility in water | Specific gravity |
|---|---|---|---|---|
|  |  |  | *Per cent* |  |
| Esters: |  |  |  |  |
| Tributyl citrate | Complete | 233.5 (22 mm.) | Insoluble | 1.046 |
| Dibutyl phthalate | do | 230 | .04 | 1.048 |
| Dimethyl phthalate | do | 296 | .45 | 1.192 |
| Butyl lactate | do | 140–200 | 3.4 | .979 |
| Tributyl phosphate | do | 180 (25 mm.) | .6 | .978 |
| Tri-octyl phosphite | do |  | Insoluble | .962 |
| Ethyl acetate | None | 102–173 | 9.7 | .885 |
| Ethers: |  |  |  |  |
| Diethyl | None | 40 | 7.5 | .832 |
| Dibutyl | Complete | 142 | Sl. soluble | .784 |
| Diamyl | do | 190 | Insoluble | .774 |
| Open Chain Alcohols: |  |  |  |  |
| Ethanol | None | 78 | All proportions | .789 |
| n-Butanol | do | 117 | 7.9 | .809 |
| n-Amyl | 5% | 138 | 2.7 | .814 |
| 2-Pentanol 4 Methyl | 50% | 131.8 | 1.7 | .808 |
| n-Hexanol | Complete | 157.2 | .59 | .820 |
| Capryl | do | 122 | .538 | .819 |
| Ethyl hexanol (octyl) | do | 183.5 | .10 | .834 |
| Lauryl | do | 37.6 (M. P.) | Insoluble | .830 |
| Hydrocarbons: |  |  |  |  |
| Petroleum ether | Complete | 36–40 | .036 | .626 |
| Hexane | do | 69 | .013 | .660 |
| Kerosene | do |  | Insoluble |  |
| Mineral oil | do |  | do |  |
| Benzene | do | 80 | .082 | .879 |
| Cyclohexane | do | 81.4 | Insoluble | .779 |
| Dry cleaners Naphtha | do | 93–98 | do | .742 |
| V. M. & P. Naphtha | do | 110–115.6 | do | .752 |
| Mineral spirits | do | 148.9–154.4 | do | .774 |
| Chlorinated hydrocarbons: |  |  |  |  |
| Ethylene dichloride | 50% | 83.5 | .92 | 1.257 |
| Carbon tetrachloride | Complete | 76–7 | .08 | 1.595 |
| Amines: |  |  |  |  |
| n-Butyl | None | 77.8 | All proportions | .740 |
| n-Hexyl | do | 132.7 | Sl. soluble |  |
| Vegetable oils: |  |  |  |  |
| Linseed | Complete |  | Insoluble |  |
| Cottonseed (bleached and refined) | do |  | do |  |
| Miscellaneous: |  |  |  |  |
| Pine oil | Complete |  | Insoluble |  |
| Nitrobenzene | do | 211 | Very slightly | 1.205 |
| Cyclohexanol (Technical Grade) | do | 161.5 | 3.0 (approx.) | .945 | the blanketing agent is chiefly responsible for this result.

Substances which may be successfully employed as blanketing agents are quite numerous and vary widely in chemical and physical properties. Extensive experimentation shows that satisfactory blanketing agents are substances which may be defined as consisting essentially of liquid organic compounds having low solubility in water, capable of forming an adsorption compound with the protein or protein-chromogen complex, and by reason of this adsorption phenomenon effectively excluding oxygen from contact with the protein or protein-chromogen complex molecule. That an adsorption compound is formed appears reasonably certain from experimental data. For instance, if hexane is the blanketing agent, the isolated protein can be dried at 60° C. under reduced pressure for a period of time sufficient to insure the removal of all the hexane from a mechanical mixture. However, if the protein is then stored for a short period in a closed container, the characteristic odor of free hexane is developed in the container in a short time. It is believed that the molecules of the blanketing agent adhere to the protein molecules in an extremely thin layer and that the adsorption phenomenon accomplishes the following results:

1. Excludes oxygen.
2. Prevents molecular aggregation.
3. Possibly insulates that portion of the molecule which can combine with the oxidized chromogen or other substances such a chlorophyll.

In the following table are listed substances which are typical of various classes of chemical compounds, certain characteristics of each compound and the degree of protection afforded thereby being indicated.

An examination of the above list indicates that solubility in water is an important factor in determining the effectiveness of a compound as a blanketing agent, and that in general solubilities of less than one percent appear desirable; of the effective agents here listed, none has a solubility of more than 4%. All of the agents indicated above as effective in blanketing the protein may be substituted for those employed in the foregoing specific examples with good results.

The enzyme inhibiting agents may likewise be selected from widely varying chemical compounds, as is indicated by the following list, representative of various types of effective chemicals:

1. Hydrocyanic acid and soluble cyanides (NaCN, etc.).
2. Thiocyanic acid and soluble thiocyanates ($NH_4SCN$, etc.).
3. Hydrofluoric acid and soluble fluorides (NaF or $NH_4FHF$, etc.).
4. Phosphoric acid and soluble phosphates like sodium phosphates, sodium hexametaphosphate, tetrasodium pyrophosphate.
5. Hydrazoic acid and soluble azides ($NaN_3$, etc.).
6. Hydroxylamine, hydrazine, etc.
7. Thiourea.
8. Carbon monoxide.
9. Sodium diethyldithiocarbamate.
10. Ascorbic acid.
11. Cysteine and salts.
12. Hydrogen sulfide and soluble sulfides like ($Na_2S$).
13. Sulfites, thiosulfates, hydrosulfites, bisulfites, and $SO_2$.

Some inhibitors are effective with respect to certain oxidizing enzymes, for example oxalacetic acid, nicotinic acid amide, iodoacetic acid, pyruvic acid.

Sometimes greater effectiveness has been attained by combining two of the above inhibitors such as $NH_4SCN$ and $Na_2S_2O_5$ or $NaCN$ and $Na_2SO_3$, etc.

Considerable attention has been given in the past to the subject of enzyme inhibitors, and the substances effective for this purpose are mentioned in the literature. It will be understood, however, that the use of agents exerting a detrimental effect on the protein should be avoided, and in general, I prefer the less rigorous enzyme inhibitors. An enzyme inhibitor may be defined as any substance which interferes with or retards the chemical reaction normally occurring as the result of the presence of an enzyme. Consequently, the inhibitor may be a compound which combines with either the protein or the prosthetic group of the enzyme to render the same inactive, or in some instances it may combine with both groups. Other substances may inhibit enzyme activity by removing the substrate, or the material upon which the enzyme acts. Thus I may employ reducing agents to remove the substrate peroxide. Prolonged heating destroys the enzyme, but is undesirable because of the adverse effect on the protein.

Like the blanketing agent, the enzyme inhibiting agent may be added at any time during the isolation process. However, the blanketing agent must be present during the drying of the protein product. As is apparent from the foregoing examples, the blanketing and inhibiting agents need not be added at the same stage in the process. Optimum results are obtained by addition of both the blanketing agent and the enzyme inhibitor during the early stage of the process. Indeed, I prefer to add the enzyme inhibitor directly to the solvent bath, and the blanketing agent to the raw material prior to solution of the protein therefrom. It may be further noted, as shown in the examples, that where a nonvolatile blanketing agent, such as lauryl alcohol, is employed, an excess amount of the blanketing agent remains with the dried protein and may be subsequently removed by solvent extraction.

My process is especially effective as applied to protein derived from soybean, but the improvement in other vegetable materials, for instance protein substances obtained from the peanut or the cottonseed, is also quite evident even from cursory visual inspection. The following examples indicate the nature of the results achieved with the use of various blanketing agents, with or without enzyme inhibitors, a photoelectric reflection meter being used to measure the color of the dry protein samples. This instrument gives readings which may be described in tri-stimulus terms. Three filters, amber (A), blue (B), and green (G), are used. The combination of object with light bulb, filters and photocell of the apparatus is optically "equivalent" to the stimuli which the average eye receives from the object in question. Thus from the readings of the meter and the application of a few simple formulae the color of a solid substance can be established objectively. For the present purpose, a suitable description of color can be established by determining luminance and "yellowness." Because the samples showed a yellow hue of practically identical dominant wave length, "yellowness" as described by Hunter in National Bureau of Standards Circular C-429 is an effective way of determining the actual amount of color present in the sample.

Luminance, often called apparent brightness, is the percentage of visual radiant energy incident on the sample that is transmitted. This is essentially the "gray" value of the sample, the percentage of light reflected back to the eye independent of any color. Perfect white has a luminance of 100%; perfect black 0%.

"Yellowness" is calculated as follows:

$$J = \text{yellowness} = \frac{A-B}{G}$$

For a white or perfectly gray surface $J=0$; the more strongly colored a yellow substance is, the higher will be the value of $J$. For bluish colors this value becomes negative.

In the accompanying chart, therefore, the G filter reading shows the "apparent brightness" or "gray" value of the sample much as the human eye would detect this quality. The yellowness value is a measure of the amount of actual color (yellow) present. In order to secure reproduceable readings the protein samples are all ground to the same mesh size of −48 to +65. The samples which have the highest G reading, and yellow values closest to zero, are the whitest.

| Protein Source | Oil extracted with | Blanketing agent | Enzyme inhibitors | Filter readings on color analysis of dry isolated proteins | | | | Comment |
| --- | --- | --- | --- | --- | --- | --- | --- | --- |
| | | | | G% | B% | A% | Yellowness | |
| Flaked soybeans | Ethanol | Pine oil | Yes | 84.0 | 77.2 | 85.9 | 0.104 | |
| Do | Hexane | Tributylphosphate | Yes | 82.8 | 72.9 | 85.2 | 0.149 | |
| Do | do | Laurylalcohol | Yes | 82.0 | 71.6 | 84.3 | 0.155 | |
| Do | do | Dibutylphthalate | Yes | 76.3 | 57.3 | 72.0 | 0.264 | |
| Do | do | Pine oil | Yes | 74.0 | 53.0 | 70.2 | 0.299 | Added blanketing agent to curd only. |
| Do | do | Octylalcohol | None | 60.2 | 45.2 | 64.2 | 0.316 | Do. |
| Commercial milk casein | | | | 67.4 | 44.2 | 72.9 | 0.426 | |
| Commercial soybean protein | | | | 56.8 | 35.0 | 62.3 | 0.480 | |
| Flaked soybeans | Hexane | None | None | 33.5 | 15.6 | 39.5 | 0.713 | |
| Ground peanuts | do | Octylalcohol | Yes | 70.4 | 62.2 | 72.9 | 0.152 | Extracted at 25° C. throughout. |
| Do | do | None | None | 34.4 | 23.6 | 39.4 | 0.459 | Do. |
| Ground cottonseeds | do | Octylalcohol | Yes | 62.3 | 39.2 | 68.5 | 0.470 | Do. |
| Do | do | None | None | 8.8 | 3.5 | 11.3 | 0.887 | Do. |

If a blanketing agent which is heavier than water is used, care must be taken not to remove the agent during centrifuging; if the blanketing agent is relatively nonvolatile, it may be necessary to extract it after the protein is dried. Suitable variations in procedure such as these will readily be made by those skilled in the art.

It will be appreciated that the present invention is not restricted to use with any particular method of protein isolation or incidental treatment, and any well-known protein extraction solvent or conventional treating agents may be used. For example, the process is applicable not only to alkaline and substantially neutral extraction methods but to acid extraction. In fact, I have found that when the pH of the oil-free flakes or other raw material is lowered to pH 1.83 or lower, the acid itself acts as an enzyme inhibitor and my invention can be practiced with only the addition of a blanketing agent, no further enzyme inhibitor being needed. However, the protein is usually much less soluble and therefore has less value in the fields in which it is commonly employed.

Other methods of retarding the discoloration of protein, based on the foregoing discoveries, will be apparent to those skilled in the art. However, such methods are less desirable than the preferred simple method of inhibiting enzyme activity and blanketing oxygen from the molecule, and result in an inferior product.

For instance, the oil may be extracted from the vegetable source by ethanol while maintaining the temperature of the system as low as practicable, the protein then extracted from the oil-free product by conventional methods, and the color thereafter partially removed by further treatment of the extracted protein with ethanol. While the resulting product is light yellow in color, it cannot be described as substantially colorless or white. Furthermore, alcohol treatment is an expensive method, the use of which is justifiable only in conjunction with my preferred method where the ultimate use of the product requires minimum discoloration. A brilliant white protein is obtained by the application of my method to flakes from which the oil has been extracted by ethanol or methanol to effect partial removal of chromogens prior to extraction of the protein. It will be observed that this practice involves control or elimination of all three factors which tend to impart color to the protein, since it involves removal of chromogens, inhibition of enzyme action, and exclusion from oxygen.

It will be appreciated that in the ultimate use of protein obtained by my method, wherein the dried protein is redissolved, care should again be exercised to insure that the protein does not become discolored while in solution. The preferred method of preventing such discoloration is the conjoint exclusion of oxygen and inhibition of enzyme activity as practiced during the isolation process. The invention therefore contemplates broadly the prevention of discoloration (in the presence of a solvent) of proteinaceous material of vegetable origin, whether in the natural state or when partially or completely isolated, by the employment of a blanketing agent and an enzyme inhibiting agent. It should be noted, however, that the invention finds its principal use in connection with the isolation of protein from the vegetable source, since the isolation process usually tends to accelerate discoloration by reason of the use in the process of large amounts of water and the maintenance of higher pH values (above 6.0). Protein prepared by my method and redissolved without the exercise of special precautions is distinctly lighter than redissolved protein prepared by conventional commercial methods.

The amounts of the blanketing and inhibiting agents employed are not critical and may vary widely. Both agents must, of course, be present in amount sufficient to perform the intended purpose, but need not be employed in quantities substantially in excess of that amount. The number of agents which are suitable for either purpose is so large that it is not feasible to recite percentage ranges in each instance, but suitable proportions are indicated by the foregoing specific examples.

Having thus described the invention, what is claimed as new and desired to be secured by Letters Patent is:

1. A method of minimizing the formation of color in protein during isolation from oleaginous seed material by the process of treating the material with a protein solvent at a pH above 6, precipitating the dissolved protein with acid, and filtering and drying the precipitate, which includes the steps of introducing in effective amounts during the isolation process and prior to the drying of the protein an enzyme inhibiting agent and a blanketing agent, said blanketing agent comprising a liquid organic compound having low solubility in water, and capable of forming an adsorption compound with protein to exclude oxygen from contact with the protein molecule and to prevent molecular aggregation of the protein during drying, and retaining the blanketing agent in contact with the protein until the latter is dried.

2. A method of obtaining a substantially colorless or white protein from oleaginous seed material, which includes the steps of adding to the material in effective amounts an enzyme inhibiting agent and a blanketing agent, said blanketing agent comprising a liquid organic compound having low solubility in water, and capable of forming an adsorption compound with protein to exclude oxygen from contact with the protein molecule and to prevent molecular aggregation of the protein during drying, treating the material with an alkaline aqueous solvent for the protein, acidulating the solution to precipitate the protein, separating the protein from the solution, drying the protein, and retaining the blanketing agent in contact with the protein until the latter is dried.

3. A method of obtaining a substantially colorless or white protein from soybean, which includes the steps of extracting oil from the soybean with a lower aliphatic primary alcohol, adding to the defatted material in effective amounts an enzyme inhibiting agent and a blanketing agent, said blanketing agent comprising a liquid organic compound having low solubility in water, and capable of forming an adsorption compound with protein to exclude oxygen from contact with the protein molecule and to prevent molecular aggregation of the protein during drying, treating the material with an alkaline aqueous solvent for the protein, acidulating the solution to precipitate the protein, separating the protein from the solution, drying the protein, and retaining the blanketing agent in contact with the protein until the latter is dried.

4. A method of obtaining a substantially colorless or white protein from soybean, which includes the steps of extracting oil from the soybean with hexane, adding to the defatted material in effective amounts an enzyme inhibiting agent and a blanketing agent, said blanketing agent comprising a liquid organic compound having low solubility in water, and capable of forming an adsorption compound with protein to exclude oxygen from contact with the protein molecule and to prevent molecular aggregation of the protein during drying, treating the material with an alkaline aqueous solvent for the protein, acidulating the solution to precipitate the protein, separating the protein from the solution, drying the protein, and retaining the blanketing agent in contact with the protein until the latter is dried.

FRANCIS E. CALVERT.

REFERENCES CITED

The following references are of record in the file of this patent:

UNITED STATES PATENTS

| Number | Name | Date |
|---|---|---|
| 1,917,734 | Rewald | July 11, 1933 |
| 2,190,644 | Rawling | Feb. 20, 1940 |
| 2,194,835 | Nickerson | Mar. 26, 1940 |
| 2,350,953 | Bain et al. | June 6, 1944 |
| 2,384,388 | Monte et al. | Sept. 4, 1945 |

OTHER REFERENCES

Markley et al., "Soybean Chemistry and Technology," Chem. Pub. Co., Inc., Brooklyn, N. Y. (1944), pp. 18 to 23.